United States Patent
Meinel Cheesman

(10) Patent No.: US 10,597,148 B2
(45) Date of Patent: Mar. 24, 2020

(54) AUTONOMOUS BRAKE-COOLING SYSTEM FOR AIRCRAFT

(71) Applicant: Kurt Franz Meinel Cheesman, Lima (PE)

(72) Inventor: Kurt Franz Meinel Cheesman, Lima (PE)

(*) Notice: Subject to any disclaimer, the term of this patent is extended or adjusted under 35 U.S.C. 154(b) by 0 days.

(21) Appl. No.: 16/089,289

(22) PCT Filed: Apr. 17, 2017

(86) PCT No.: PCT/PE2017/000006
§ 371 (c)(1),
(2) Date: Sep. 27, 2018

(87) PCT Pub. No.: WO2018/088915
PCT Pub. Date: May 17, 2018

(65) Prior Publication Data
US 2019/0112037 A1    Apr. 18, 2019

(30) Foreign Application Priority Data
Nov. 9, 2016   (PE) .................. 2200-2016

(51) Int. Cl.
*B64C 25/42* (2006.01)
*F16D 65/827* (2006.01)
(Continued)

(52) U.S. Cl.
CPC .............. *B64C 25/42* (2013.01); *B64D 13/00* (2013.01); *B64D 13/006* (2013.01); *B64D 13/06* (2013.01);
(Continued)

(58) Field of Classification Search
CPC ....... B64C 25/42; F16K 15/03; F16D 65/827; F16D 65/847; F16D 65/807; B64D 13/08; B64D 13/00; B64D 13/06; B64D 13/006
(Continued)

(56) References Cited

U.S. PATENT DOCUMENTS 2,198,792 A * 4/1940 Schjolin ................. B60K 11/00
                                                    180/68.2
3,664,467 A * 5/1972 Lucien .................. F16D 65/847
                                                    188/71.6
(Continued)

FOREIGN PATENT DOCUMENTS

EP   1906068 A1   4/2008
EP   2772428 A1   9/2014
(Continued)

OTHER PUBLICATIONS

Written Opinion of International Searching Authority for PCT Application No. PCT/PE2017/000006, dated Jul. 19, 2017, 16 pages with machine translation.
(Continued)

*Primary Examiner* — Pamela Rodriguez
(74) *Attorney, Agent, or Firm* — TraskBritt

(57) ABSTRACT

The object of this disclosure is to cool the brakes of the landing gear of an aircraft. For this, it uses the air of the same air conditioning system of the airplane. The supply to the air conditioning system of the airplane can receive pre-conditioned air from outside by an air inlet in the lower part of the fuselage of the airplane to which an external equipment is connected. This air inlet has a non-return valve inside, which prevents the air from going outside. In order to extract the air from the air conditioning system of the airplane while it is on the ground, it is necessary to overpass the air valve. For this purpose, a tool that overpasses that valve from outside has been designed, and in this way, extracting and directing
(Continued)

the air through connectors and tubes to the brakes, cooling them for a new takeoff.

5 Claims, 5 Drawing Sheets

(51) Int. Cl.
*B64D 13/08* (2006.01)
*B64D 13/00* (2006.01)
*F16D 65/847* (2006.01)
*F16K 15/03* (2006.01)
*B64D 13/06* (2006.01)

(52) U.S. Cl.
CPC ........... *B64D 13/08* (2013.01); *F16D 65/827* (2013.01); *F16D 65/847* (2013.01); *F16K 15/03* (2013.01)

(58) Field of Classification Search
USPC .............. 188/264 A, 264 AA, 71.6, 218 XL, 188/218 R; 244/110 A, 130 R, 111; 301/6.3
See application file for complete search history.

(56) References Cited

U.S. PATENT DOCUMENTS

| | | | | |
|---|---|---|---|---|
| 4,592,452 | A * | 6/1986 | Merle | F16D 65/847 |
| | | | | 188/264 AA |
| 7,568,498 | B2 * | 8/2009 | Denike | F16K 15/038 |
| | | | | 137/512.1 |
| 8,333,438 | B2 * | 12/2012 | Caule | B64C 25/36 |
| | | | | 188/264 AA |
| 9,573,567 | B2 * | 2/2017 | Kirkbride | B64C 25/42 |
| 2010/0223773 | A1 | 9/2010 | Florian | |
| 2014/0345991 | A1 * | 11/2014 | Zywiak | B64C 25/42 |
| | | | | 188/264 R |

FOREIGN PATENT DOCUMENTS

| | | |
|---|---|---|
| EP | 2815964 A1 | 12/2014 |
| WO | 1997/047520 A1 | 12/1997 |

OTHER PUBLICATIONS

International Search Report for PCT Application No. PCT/PE2017/000006, dated Jul. 19, 2017, 8 pages.

* cited by examiner

AUTONOMOUS BRAKE-COOLING SYSTEM FOR AIRCRAFT

CROSS-REFERENCE TO RELATED APPLICATION

This application claims priority to International Patent Application PCT/PE2017/000006, filed Apr. 17, 2017, designating the United States of America and published in Spanish as International Patent Publication WO 2018/088915 A1 on May 17, 2018, which claims the benefit under Article 8 of the Patent Cooperation Treaty to Peruvian Patent Application Serial No. 002200-2016/DIN, filed Nov. 9, 2016.

TECHNICAL FIELD

The disclosure is developed in the technical field of aeronautics in the branch of brake cooling systems for aircrafts.

BACKGROUND

Aircrafts are currently known to have their own brake cooling system, characterized by a fan blade driven by an electric motor installed in the center of the brake discs of the wheels of the aircraft, which operate when the aircraft is on the ground.

When this system is not installed or if the system is inoperative, there is no way to cool the brakes quickly, which causes delays in flight itineraries, since there are limitations related to the temperatures of the brakes. In general, brake temperatures cannot exceed 300° C. because the hydraulic fluid in the brakes becomes flammable at temperatures slightly higher than this. With high temperatures, there is also a risk that the airplane tires deflate when the thermal fuses in the wheel rims melt at around 800° C., and that tires explode due to high temperatures of the landing gear brakes. For these reasons, it is not allowed to continue with the next flight until the brake temperatures drop.

There are also portable external fans that cool the brakes, but these work with external electric power or gasoline, which is not always available, and represent a safety risk and even more so when the aircraft is recharging fuel.

There is no method, procedure or equipment available to cool the airplane brakes if the aforementioned airplane brake cooling systems are not available.

BRIEF SUMMARY

This disclosure is developed to solve the technical problems of brake heating in aircrafts on ramp after landing when they do not have the cooling systems installed in the brakes or when the airport facilities do not have external cooling systems, in addition to being more secure with respect to electrical cooling equipment, due to fire risk especially when the plane refuels.

Due to the aforementioned problems, it is desirable to have a cold air source for when the cooling equipment of the airplane is not available to ventilate and cool the brakes, without having to resort to external sources or airport equipment.

This disclosure uses the cold air from the same air conditioning system of the airplane and directs it toward the brake assemblies. For this purpose, the cooling system has: a connector that is installed in the external air conditioning inlet of the airplane; a series of ducts (or hoses) that by means of a main duct, which bifurcates in two, communicates the air inlet toward the lateral zones of the wheels of the landing gear and couplings to the brake system.

The air is extracted by overpassing the "one-step" valve or "non-return valve" that is part of the air conditioning system of the airplane and which is at a short distance from the air inlet and serves to prevent the air that goes from the air conditioning systems of the airplane to the passenger cabin from going outside. This valve is spranged in the closed position and only opens when the pressure of the air that enters pushes inwards.

In order to extract air from that inlet, it is necessary to overpass this valve, that is, open it, for that purpose an overpass tool has been designed, which has two preferred embodiments, for two different types of valves present in current manufacturing airplanes.

The tool that, when connected to the "one-step" valve, opens it from the outside, allows the air to exit through the air conditioning inlet of the airplane and is directed by means of ducts to the brakes.

The first embodiment modality, is characterized in that it comprises two plates joined together, which bifurcate forming a "Y" or fork, which has two bearings at their ends which, when introducing the tool, push the wings of the valve, opening it. This is fixed to the duct by means of a tube that extends horizontally, by springs, and is fixed to the sides of the duct.

The second embodiment modality is characterized in that it has two scissor-shaped rods. One tip is attached to the connector and the other end has a roller that serves to open the bypass valve. The other rod connects the first to the middle, making the roller to go up when moving it, and opening the valve.

BRIEF DESCRIPTION OF THE DRAWINGS

To complement the description and with the objective of facilitating the understanding of the disclosure characteristics, a set of illustrative and non-limiting drawings is attached to the present specification.

Figure 1:
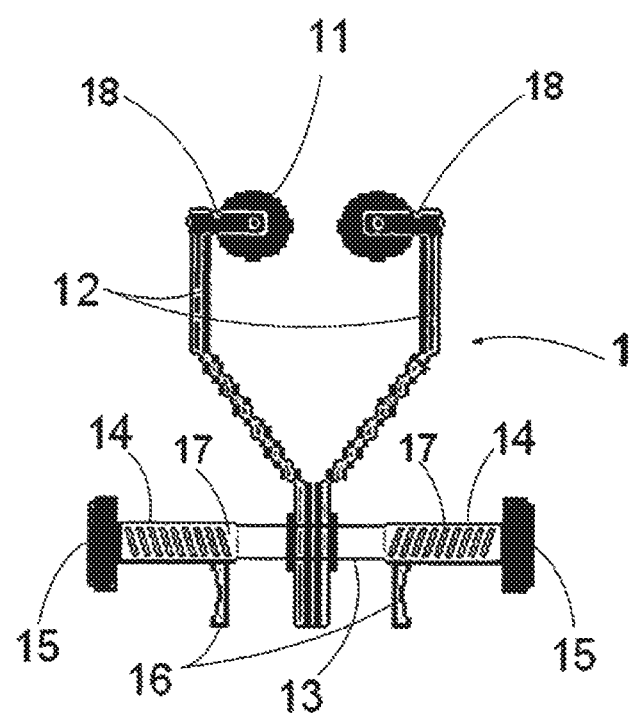
FIG. 1: View of the first preferred tool embodiment, which performs the overpass of the valve of two plates.

In these figures there are numerical references of the following elements that constitute and/or allow the understanding of the disclosure:

1. Overpassing tool
2. Non-return valve of the two-plate type
3. Duct system
4. Valve plates 5. Air conditioning duct of the airplane
11. Rollers of the first tool modality
12. Two plates joined to form a "Y" or fork.
13. Pipe fixed to the plates.
14. Compatible mobile tubes.
15. Rubber cushions to fix the tool to the duct.
16. Triggers fixed to the compressible tube.
17. Springs.
18. "C" shaped plate
19. Bolts that join the two plates
20. Bottom structure of the airplane
21. Standard connector for external air conditioning of aircrafts
22. Opening rod.
23. Lifting rod.
24. Roller of the second tool modality
25. Non-return valve of the single-plate type
26. Clamp of the opening rod to the connector (21).
27. Handle of the lifting rod.
28. Lid of the air conditioning inlet of the airplane.
29. Hinge of the air conditioning inlet lid of the airplane.
30. Lock of the air conditioning inlet lid of the airplane.
31. Main duct
32. "T" tube that bifurcates into two secondary tubes.
33. Secondary tubes.
34. Shock absorber of the landing gear.
35. Assemblies of brakes and rims.
36. Tires.
37. Coupling to the brake assemblies.
38. "L" connector.
39. Thermal insulation
40. Air inlet to the brake assembly.
41. Discs in shape of plates.

DETAILED DESCRIPTION

As it can be seen in the attached figures, this cooling system comprises a connector 21, a duct system 3, couplings to the wheel brake assembly 37, and a tool 1 configured to open the two-plate type valve (FIG. 1).

The bifurcations of the tool 12 in its first preferred embodiment modality, are characterized by having two bearings 11 (e.g., rollers) at their ends, fastened by bolts to a transverse plate with the ends bent at 90° forming a "C" 18.

When installing the tool 1, it inserts the bearings 11 and pushes the pair of valve plates 4 pushing them in, rotating on the shaft to which they are attached, opening them and thus allowing the extraction of air conditioning system of the airplane.

In aircrafts that have a two-plate non-return valve 2 before connecting the Standard Connector 21, the tool must be attached to the duct, pressing the triggers 16 against each other, compressing the springs 17, and once the bearings 11 are fitted to the sides of the valve, the triggers 16 are released, allowing the springs to expand and fix the tool to the duct. The connector 21 is then attached to the air conditioning inlet.

Figure 2A:
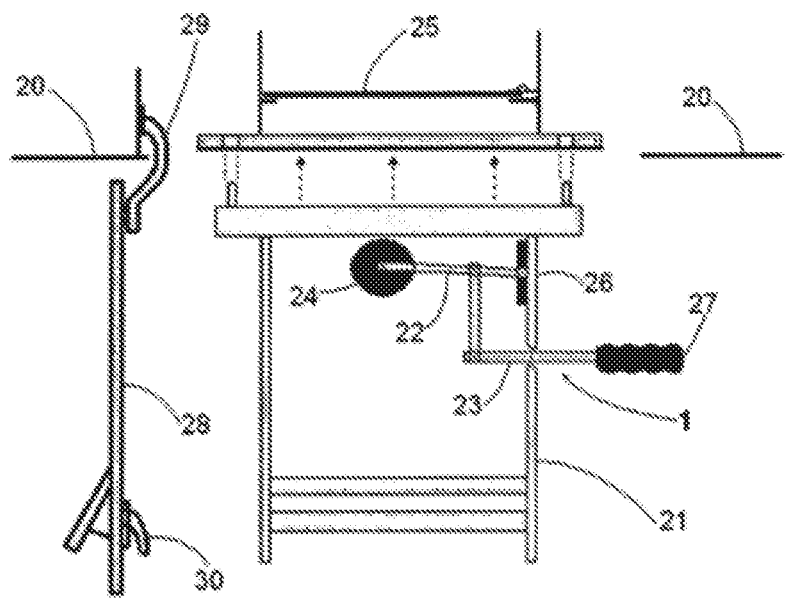
FIG. 2A: View of the second preferred tool embodiment that performs the overpass of the single plate valve, in closed position.
Figure 2B:
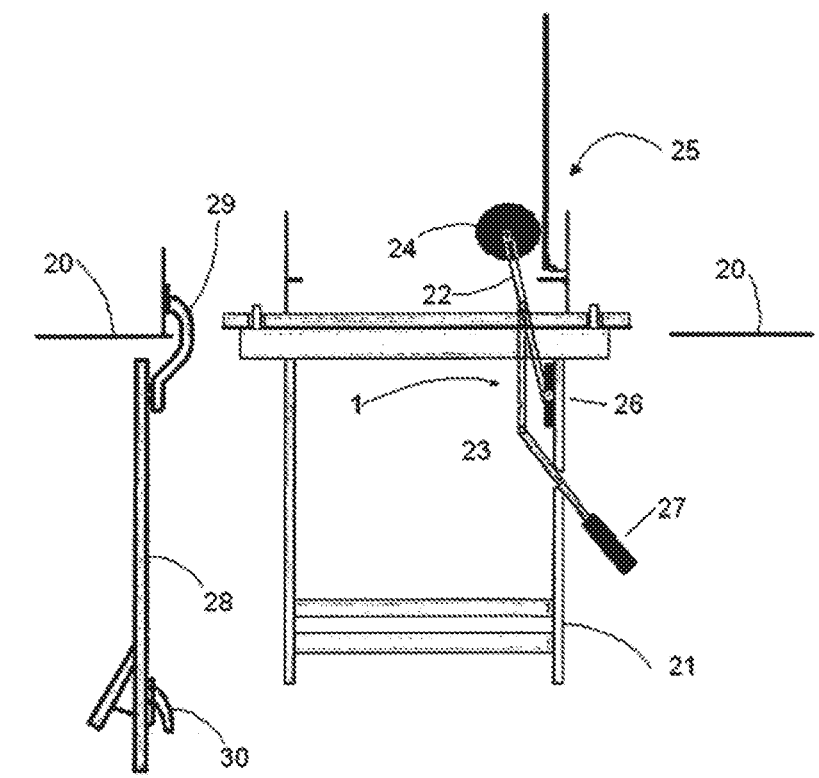
FIG. 2B: View of the second preferred embodiment of the tool that performs the overpass of the single plate valve, in the open position
Figure 3:
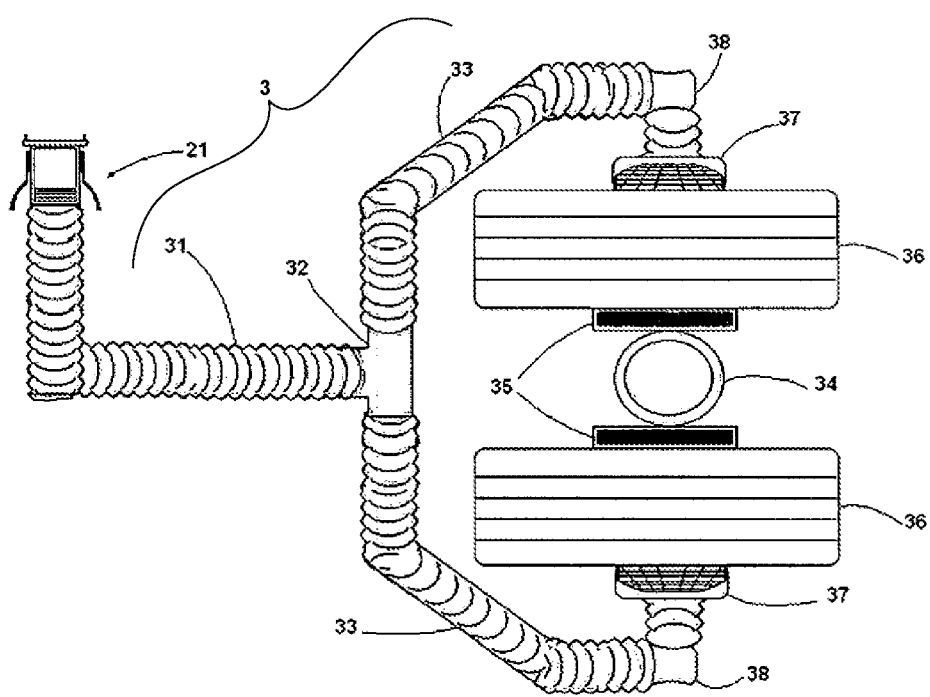
FIG. 3: View from above of the landing gear with the ducts attached to the brake assemblies.
Figure 4:
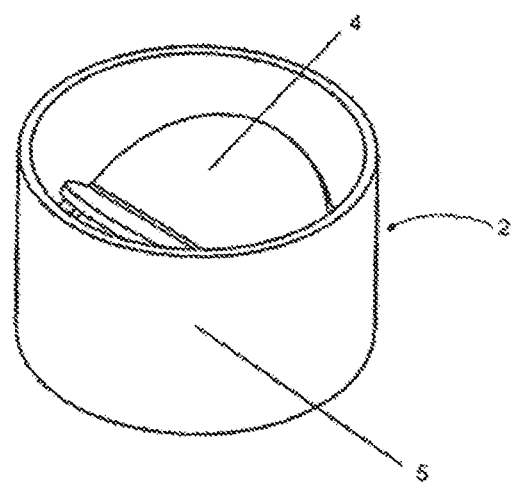
FIG. 4: Isometric view of the non-return valve of the type having two plates rotating around an axis.
Figure 5:
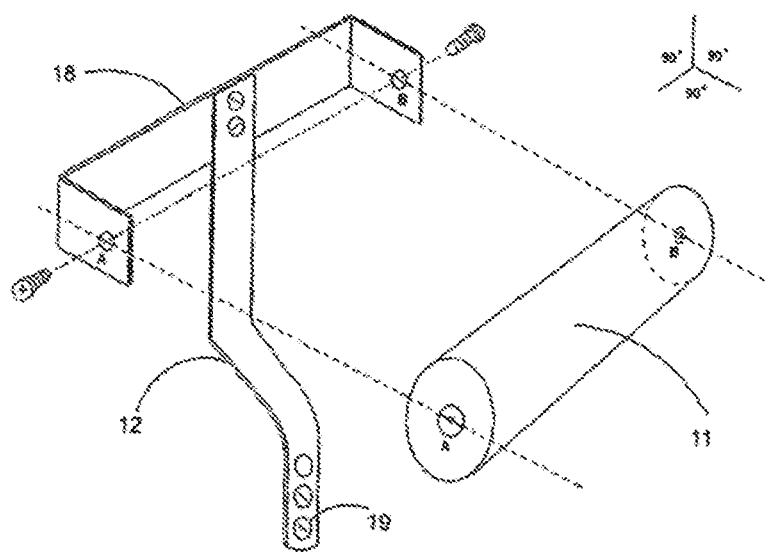
FIG. 5: Explosion view of the first preferred tool embodiment, which explains how the rollers are attached to the tool body.
Figure 6:
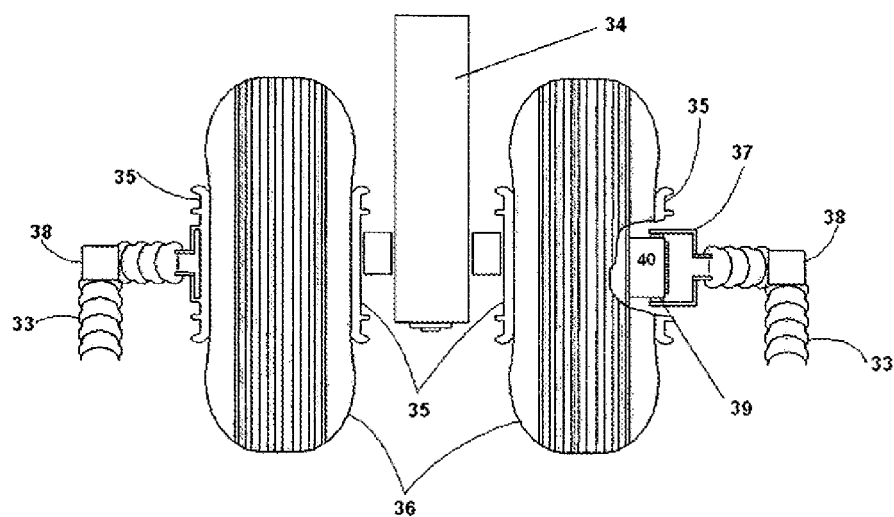
FIG. 6: Front view of the landing gear with the connectors to the brake assemblies.
Figure 7:
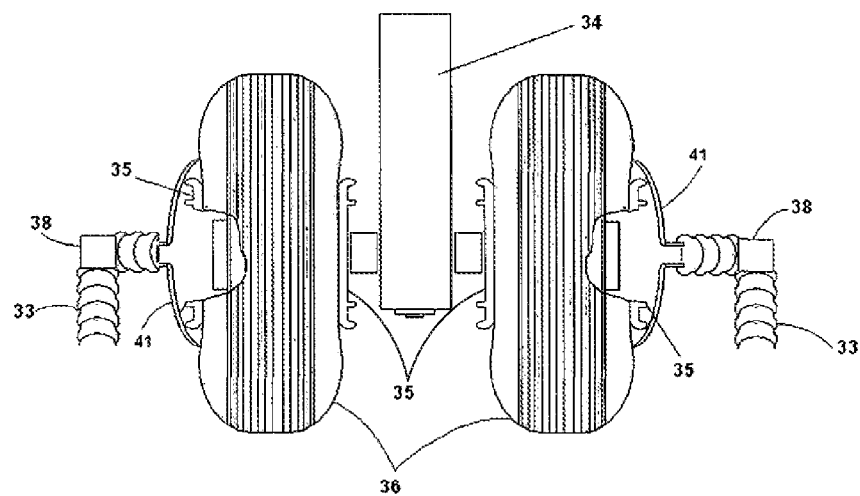
FIG. 7: Front view of the landing gear with disc connectors in the shape of plates.

In aircrafts presenting the single-plate type valve 25, a second mode of the tool is also used to open the valve (FIG. 2). This last tool is fixed inside the standard connector by means of an anchor 26.

For aircrafts that have a single-plate valve (FIG. 2), the standard connector that includes a second tool embodiment modality is attached, so that once connected, moving the lifting rod 23, it moves the opening rod 22, and through the roller 24, it opens the valve of the single-plate type 25.

The duct system 3 consists in its preferred embodiment of a main duct 31, a connector in the form of "T" 32, which divides into two secondary ducts 33 to carry air to the couplings in "L" 38 and these to the brake couplings 37 (i.e., connectors), which are fitted in the air inlets of the brakes 40. Discs can also be used in the form of plates that join the tires to allow air to reach the entire tire rim 41.

The disclosure has application to the aeronautical industry by implementing the system and procedure to aircrafts that do not have the brake cooling system and arriving at airports where there is no external brake cooling systems and have to wait several hours on ramp, so that they cool on their own.

Cooling the brakes quickly and efficiently not only saves time and money to the airlines, but also cold brakes provide the necessary safety for the next takeoff.

The invention claimed is:

1. A brake cooling system for aircraft, comprising:
   a connector;
   a tool configured to open an air conditioning valve of the aircraft, the tool comprising:
      two plates that form a "Y" or fork, wherein the two plates are joined by a plurality of bolts;
      a tube fixed to the plates;
      a mobile tube attached externally to the fixed tube;
      springs compressed inside the mobile tube; and
      two triggers attached to the mobile tube; and
   a duct system configured to connect an air conditioner to the brakes of the aircraft via couplings.

2. The brake cooling system according to claim 1, wherein the tool further comprises an opening rod fixed to the connector by a clamp with bolts;
   a lifting rod connected with a bolt to the opening rod;
   a roller attached to the end of the opening rod; and
   a handle attached to one end of the lifting rod.

3. The brake cooling system according to claim 2, wherein the duct system comprises a main duct having a first end connected to the connector and a second end connected to a "T" connector, wherein the "T" connector connects to two secondary tubes, and wherein the secondary tubes also connect to two "L" connectors that connect two couplings to the brakes.

4. The brake cooling system according to claim 1, characterized in that air is extracted from an air conditioning external system of the airplane.

5. An opening tool for valves, comprising:
   two plates that form a "Y" or fork joined with a plurality of bolts;
   a tube fixed to the plates;
   a mobile tube attached externally to the fixed tube;
   springs compressed inside the mobile tube; and
   two triggers attached to the mobile tube.

* * * * *